(12) United States Patent
Lee et al.

(10) Patent No.: US 12,452,487 B2
(45) Date of Patent: Oct. 21, 2025

(54) METHOD AND APPARATUS FOR RECEIVING ADAPTIVE MEDIA STREAMING AND ADAPTIVE MEDIA STREAMING SYSTEM

(71) Applicant: ELECTRONICS AND TELECOMMUNICATIONS RESEARCH INSTITUTE, Daejeon (KR)

(72) Inventors: Je-Won Lee, Daejeon (KR);
Joon-Young Jung, Daejeon (KR);
Dong-Joon Choi, Daejeon (KR);
Eun-Hee Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/498,792

(22) Filed: Oct. 31, 2023

(65) Prior Publication Data

US 2024/0163511 A1  May 16, 2024

(30) Foreign Application Priority Data

Nov. 4, 2022 (KR) .......... 10-2022-0145839

(51) Int. Cl.
*H04N 21/442* (2011.01)
*H04N 21/437* (2011.01)
*H04N 21/44* (2011.01)
*H04N 21/845* (2011.01)

(52) U.S. Cl.
CPC ..... *H04N 21/44209* (2013.01); *H04N 21/437* (2013.01); *H04N 21/44004* (2013.01); *H04N 21/8456* (2013.01)

(58) Field of Classification Search
CPC .......... H04N 21/44209; H04N 21/437; H04N 21/44004; H04N 21/8456
See application file for complete search history.

(56) References Cited

U.S. PATENT DOCUMENTS

| 9,654,528 | B1* | 5/2017 | Cho ................. H04L 65/75 |
| 9,860,293 | B2 | 1/2018 | Thang et al. |
| 10,045,162 | B2 | 8/2018 | Yun et al. |
| 2017/0026713 | A1 | 1/2017 | Yin et al. |
| 2018/0167431 | A1 | 6/2018 | Kim et al. |

(Continued)

FOREIGN PATENT DOCUMENTS

| KR | 10-1518046 B1 | 5/2015 |
| KR | 10-1837637 B1 | 3/2018 |
| KR | 10-1982290 B1 | 5/2019 |

*Primary Examiner* — Yassin Alata

(57) ABSTRACT

Disclosed herein is a method for receiving adaptive media streaming. The method may include calculating segment download time for each video quality level based on network throughput, a segment bitrate for the video quality level, segment duration, and a standard deviation of segment bitrates, determining a segment bitrate for maximizing the quality of viewing experience of a user based on the segment download time for each video quality level and a buffer level received from a playback buffer, making a request for the determined segment bitrate, transferring the request to a server, and transferring a corresponding video segment received in response to the request to the playback buffer.

16 Claims, 13 Drawing Sheets

(56) References Cited

U.S. PATENT DOCUMENTS

2020/0036766 A1\* 1/2020 Mahvash ......... H04N 21/23439
2022/0191592 A1   6/2022 Gairuboina et al.
2023/0388515 A1\* 11/2023 Suri ................... H04N 19/146

\* cited by examiner

|  | VALUE (Mbps) | CUMULATIVE DISTRIBUTION FUNCTION AT VALUE |
|---|---|---|
| $\mu + \sigma$ | 4.2191 | 0.84135 |
| $\mu + 2\sigma$ | 5.0027 | 0.97725 |
| $\mu + 3\sigma$ | 5.7864 | 0.99865 |

FIG. 8

Input: $N_S$: the total number of video qualities
$C_n^{[\cdot]}$: the predicted network throughput
$T_n^{BL}$: the current buffer level before requesting the segment $n$
$T_{n,k}^{RB}$: the rebuffering time when downloading $R_{n,k}$
$T_n^S$: the segment duration
$R_{n-1}^{[\cdot]}$: the downloaded segment with index $n-1$

Output: $R_{n,k}$: the segment with index $n$ and quality $k$

1: for $k = 1:N_s^{[\cdot]}$ do

2: $\quad T_{n,k}^D = \dfrac{R_{n,k} \cdot T_n^S}{C_n}$

3: $\quad$ if $T_{n,k}^D < T_n^{BL}$ then

4: $\quad\quad T_{n,k}^{RB} = 0$

5: $\quad$ else

6: $\quad\quad T_{n,k}^{RB} = T_{n,k}^D - T_n^{BL}$

7: $\quad$ end if

8: $\quad \text{QoE}_{n,k} = q(R_{n,k}) - \mu \cdot T_{n,k}^{RB} - \lambda \left| q(R_{n,k}) - q(R_{n-1}) \right|$ 9: end for

10: Return $R_{n,k} = \underset{R_{n,k}}{\text{argmax}} \text{QoE}_{n,k}$

FIG. 9

```
Representation <id="#">
mimeType="video/mp4" codecs="av01.0.12M.08"
bandwidth="1600000" std="78366" width="3840"
height="2160" sar="1:1"
```

FIG. 10

| MEAN | 6.00 | 5.03 | 2.96 | 2.06 | 1.43 | 0.99 | 0.69 | 0.48 | 0.33 | 0.23 |
|---|---|---|---|---|---|---|---|---|---|---|
| STANDARD DEVIATION | 1.08 | 0.89 | 0.56 | 0.39 | 0.28 | 0.18 | 0.12 | 0.10 | 0.05 | 0.04 |

FIG. 11

| NETWORK TRACE | MEAN THROUGHPUT [Mbps] |
|---|---|
| TRACE 1 | 1.474 |
| TRACE 2 | 2.800 |
| TRACE 3 | 2.334 |
| TRACE 4 | 2.559 |
| TRACE 5 | 1.933 |

FIG. 12

|  | NETWORK TRACE | QoE | AVERAGE $R_n$ [Mbps] | AVERAGE $T_n$ [Sec] | Average $\lvert R_{n+1} - R_n \rvert$ [Mbps] |
|---|---|---|---|---|---|
| MPC + PROPOSED | TRACE 1 | 0.889 | 1.388 | 0.0261 | 0.386 |
|  | TRACE 2 | 1.2177 | 2.4 | 0.131 | 0.619 |
|  | TRACE 3 | 1.1073 | 2.32 | 0.109 | 0.744 |
|  | TRACE 4 | 1.1473 | 2.41 | 0.099 | 0.837 |
|  | TRACE 5 | 0.0917 | 1.86 | 0.281 | 0.56 |
| MPC | TRACE 1 | 0.375 | 1.418 | 0.156 | 0.373 |
|  | TRACE 2 | 0.285 | 2.311 | 0.306 | 0.711 |
|  | TRACE 3 | 0.486 | 2.307 | 0.242 | 0.780 |
|  | TRACE 4 | 0.598 | 2.488 | 0.221 | 0.939 |
|  | TRACE 5 | -0.448 | 1.928 | 0.416 | 0.588 |

FIG. 14

METHOD AND APPARATUS FOR RECEIVING ADAPTIVE MEDIA STREAMING AND ADAPTIVE MEDIA STREAMING SYSTEM

CROSS REFERENCE TO RELATED APPLICATION

This application claims the benefit of Korean Patent Application No. 10-2022-0145839, filed Nov. 4, 2022, which is hereby incorporated by reference in its entirety into this application.

BACKGROUND OF THE INVENTION

1. Technical Field

The present disclosure relates to a method, apparatus, and system for improving the quality of viewing experience of users in a media streaming system that adaptively downloads video segments encoded at a Variable Bit Rate (VBR) in a dynamic network environment.

2. Description of the Related Art

Dynamic Adaptive Streaming over HTTP (DASH) is an ISO/IEC Moving Picture Experts Group (MPEG) standard and is an adaptive video streaming technique based on TCP/HTTP. In a DASH system, a server provides a client with video segments encoded at different bitrates and a Media Presentation Description (MPD) in response to a request from the client. Upon receiving the MPD, the client requests video segments of suitable quality from the server in consideration of a playback buffer state, available throughput, and the like.

'Bitrate' refers to the amount of data transmitted for a certain time period, and bits per second (bps), which is the number of bits transmitted per second, is generally used as the unit thereof. The bitrate affects video quality. Generally, the higher the bitrate, the higher the quality of video.

The client of the adaptive streaming system uses an Adaptive Bit Rate (ABR) algorithm in order to provide good viewing experience to users. The ABR algorithm may be implemented in any of various methods based on a playback buffer, throughput, the quality of experience of a user, and the like, but the purpose thereof is to select the bitrate for optimizing the quality of viewing experience of users.

In the ABR algorithm, the bitrate of the segment to be requested next is set based on network throughput, a playback buffer level, a segment bitrate, and the like, which are acquired during the download of video segments. In the ABR algorithm, it is ideal to set the optimal segment bitrate without causing interruption of playback, but the following difficulties arise.

First, it is difficult to accurately estimate the future network throughput. Also, it is necessary to maximize a segment bitrate and minimize rebuffering time in order to maximize the quality of viewing experience of a user, but these two objectives conflict with each other.

Further, in the streaming system for downloading segments encoded at a variable bitrate, segments with the same average bitrate have different sizes. Accordingly, when information thereabout is not provided in advance, the accuracy of calculated segment download time is decreased, whereby the quality of viewing experience of a user may be degraded.

SUMMARY OF THE INVENTION

An object of the present disclosure is to provide a method and apparatus for receiving adaptive media streaming and an adaptive media streaming system in order to solve the problem of degradation of the quality of viewing experience of a user, which may be caused due to the uncertainty of network throughput and a segment size.

In order to accomplish the above object, a method for receiving adaptive media streaming according to an embodiment may include calculating segment download time for each video quality level based on network throughput, a segment bitrate for the video quality level, segment duration, and a standard deviation of segment bitrates, determining a segment bitrate for maximizing the quality of viewing experience of a user based on the segment download time for each video quality level and a buffer level received from a playback buffer, making a request for the segment bitrate, transferring the request to a server, and transferring a corresponding video segment received in response to the request to the playback buffer.

Determining the segment bitrate for maximizing the quality of viewing experience of the user may include calculating rebuffering time using the segment download time for each video quality level and the buffer level received from the playback buffer, calculating the quality of viewing experience of the user using the segment bitrate, the bitrate of a previously downloaded segment, and the rebuffering time, and selecting the segment bitrate for maximizing the quality of viewing experience of the user.

The segment download time for each video quality level may be calculated using Equation (1):

$$T_{n,k}^D = \frac{(R_{n,k} + v\sigma) \cdot T_n^S}{C_n} \quad (1)$$

The standard deviation of the segment bitrates may be acquired from a Media Presentation Description (MPD) of the server.

The standard deviation of the segment bitrates may be calculated based on a mean bitrate acquired by interpreting the MPD of the server.

The standard deviation of the segment bitrates may be calculated using Equation (2):

$$\sigma_{n,k} = \sqrt{\frac{1}{N}\sum_{n=1}^{N}(R_{n,k} - R_k)^2} \quad (2)$$

Also, in order to accomplish the above object, an apparatus for receiving adaptive media streaming according to an embodiment includes memory in which a control program for receiving adaptive media streaming is stored and a processor for executing the control program stored in the memory. The processor may calculate segment download time for each video quality level based on network throughput, a segment bitrate for the video quality level, segment duration, and a standard deviation of segment bitrates, determine a segment bitrate for maximizing the quality of viewing experience of a user based on the segment download time for each video quality level and a buffer level received from a playback buffer, make a request for the determined segment bitrate, transfer the request to a server, and transfer a corresponding video segment received in response to the request to the playback buffer.

The processor may determine the segment bitrate for maximizing the quality of viewing experience of the user, calculate rebuffering time using the segment download time for each video quality level and the buffer level received from the playback buffer, calculate the quality of viewing experience of the user using the segment bitrate, the bitrate of a previously downloaded segment, and the rebuffering time, and select the segment bitrate for maximizing the quality of viewing experience of the user.

The segment download time for each video quality level may be calculated using Equation (1):

$$T_{n,k}^D = \frac{(R_{n,k} + v\sigma) \cdot T_n^S}{C_n} \quad (1)$$

The standard deviation of the segment bitrates may be acquired from an MPD of the server.

The standard deviation of the segment bitrates may be calculated based on a mean bitrate acquired by interpreting the MPD of the server.

The standard deviation of the segment bitrates may be calculated using Equation (2):

$$\sigma_{n,k} = \sqrt{\frac{1}{N}\sum_{n=1}^{N}(R_{n,k} - R_k)^2} \quad (2)$$

Also, in order to accomplish the above object, a system for receiving adaptive media streaming according to an embodiment may include a client including a network throughput predictor module for predicting network throughput, a bitrate control module for calculating segment download time for each video quality level based on the network throughput, a segment bitrate for the video quality level, segment duration, and a standard deviation of segment bitrates, determining a segment bitrate for maximizing the quality of viewing experience of a user based on the segment download time for each video quality level and a buffer level received from a playback buffer, and making a request for the determined segment bitrate, and an HTTP module for transferring the request to a server; and the server for transferring a corresponding video segment to the HTTP module in response to the request.

The server may store video segments encoded in advance at different bitrates and an MPD in which segment-related information is described.

The MPD may include the standard deviation of the segment bitrates.

The client may calculate rebuffering time using the segment download time for each video quality level and the buffer level received from the playback buffer, calculate the quality of viewing experience of the user using the segment bitrate, the bitrate of a previously downloaded segment, and the rebuffering time, and select the segment bitrate for maximizing the quality of viewing experience of the user.

The segment download time for each video quality level may be calculated using Equation (1):

$$T_{n,k}^D = \frac{(R_{n,k} + v\sigma) \cdot T_n^S}{C_n} \quad (1)$$

The standard deviation of the segment bitrates may be calculated based on a mean bitrate acquired by interpreting the MPD of the server.

The standard deviation of the segment bitrates may be calculated using Equation (2):

$$\sigma_{n,k} = \sqrt{\frac{1}{N}\sum_{n=1}^{N}(R_{n,k} - R_k)^2} \quad (2)$$

BRIEF DESCRIPTION OF THE DRAWINGS

The above and other objects, features, and advantages of the present disclosure will be more clearly understood from the following detailed description taken in conjunction with the accompanying drawings, in which:

FIG. 8 is a view illustrating three standard deviations for the segment bitrate distribution of FIG. 5;

FIG. 9 is a view for explaining a segment bitrate selection method of Media Predictive Control (MPC) according to an embodiment;

FIG. 10 is a view illustrating the structure of 'Representation' element in an MPD according to an embodiment;

FIG. 11 is a view illustrating the mean and standard deviation of the bitrates of segments encoded at a variable bitrate according to an embodiment;

FIG. 12 is a view illustrating the mean throughput of a network trace according to an embodiment;

FIG. 14 is a view illustrating a comparison in a result of performance evaluation of quality of experience (QoE) of a user between an embodiment and a conventional method;

DESCRIPTION OF THE PREFERRED EMBODIMENTS

Figure 1:
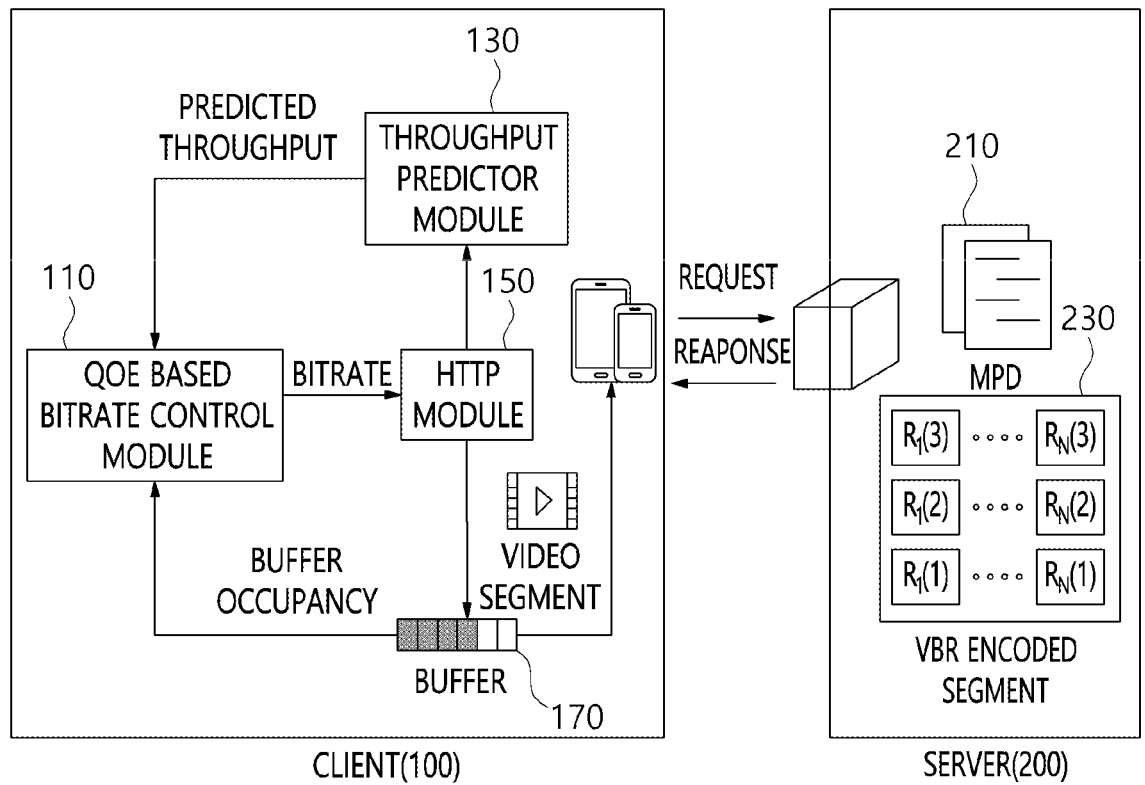
FIG. 1 is a block diagram illustrating an adaptive media streaming system according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating an adaptive media streaming system according to an embodiment.

Referring to FIG. 1, the adaptive media streaming system according to an embodiment may include a client 100 and a server 200. Here, the client 100 may be an apparatus for receiving adaptive media streaming. The server 200 may be an apparatus for transmitting adaptive media streaming.

The client 100 may start playback after filling a playback buffer with two or three segments. The client 100 may include a bitrate control module 110 based on quality of viewing experience (a QoE-based bitrate control module), a throughput predictor module 130, and an HTTP module 150.

The bitrate control module 110 may calculate segment download time for each video quality level based on network throughput, set the bitrate of the next segment for maximizing the quality of viewing experience of a user using a buffer level (remaining playout time information) provided from the playback buffer 170, and request the bitrate from the server 200. In an embodiment, the standard deviation of segment bitrates may be used in order to calculate the segment download time for each video quality level, and this will be described in detail later.

The throughput predictor module 130 may predict network throughput using the size of a segment received from the server 200 and the download time.

The HTTP module 150 may process the request from the bitrate control module 110 and transfer the same to the server 200, and may receive the corresponding video segment from the server 200 and transfer the same to the playback buffer 170.

The server 200 may store a Media Presentation Description (MPD) 210 and video segments 230. The MPD 210 may contain information about the segments. The video segments 230 may be encoded in advance at different bitrates (or different video quality levels).

Figure 2:
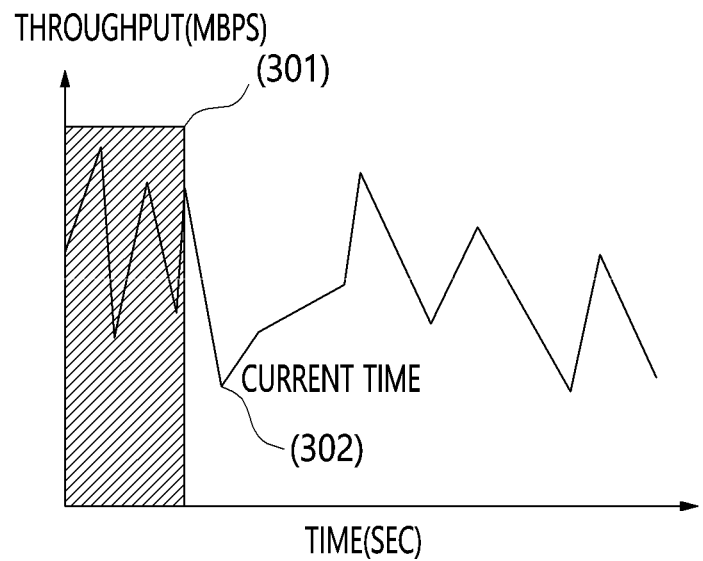
FIG. 2 is a graph illustrating the concept of variable throughput according to an embodiment.

FIG. 2 is a graph illustrating the concept of variable throughput according to an embodiment.

As illustrated in FIG. 2, the throughput predictor module 130 predicts throughput using previous pieces of throughput information 301. However, a network dynamically changes, which causes an error between the throughput predicted by the throughput predictor module 130 and the current network throughput 302. In order to reduce the error, the throughput predictor module 130 may predict throughput using a method of averaging the previous pieces of throughput information 301, a method of using a control theory, or the like.

Figure 3:
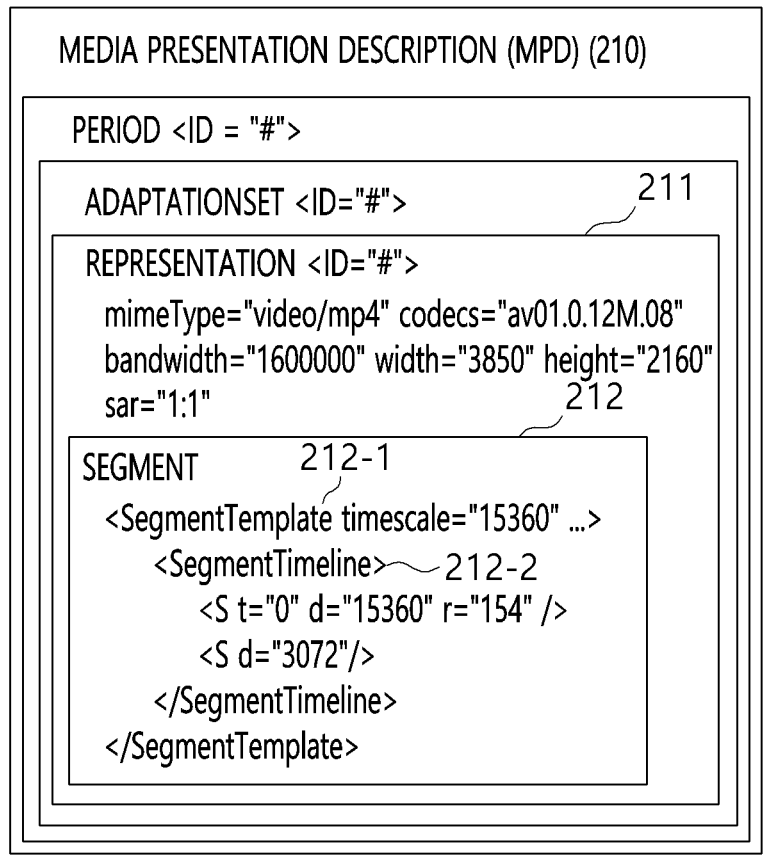
FIG. 3 is a view illustrating a Media Presentation Description (MPD) structure according to an embodiment.

FIG. 3 is a view illustrating the structure of an MPD according to an embodiment.

As illustrated in FIG. 3, the MPD 210 may have a hierarchical structure. The MPD 210 may include a 'Representation' element 211 and a 'Segment' element 212. The MPD 210 may further include a 'Period' element and an 'AdaptationSet' element. In an embodiment, the MPD 210 may include a standard deviation of segment bitrates, and this will be described later.

The 'Representation' element 211 includes a mean segment bitrate, resolution, and encoder information. Because the quality of content can be identified through the information of the 'Representation' element 211, an adaptive streaming service becomes possible in a dynamic network environment.

The 'Segment' element 212 is generally represented as a time-unit value. The timescale defined in 'SegmentTemplate' 212-1 is the unit time. In 'SegmentTimeline' 212-2, t denotes a start time, d denotes the duration of each segment, and r denotes the number of segments having the same duration. In the general MPD structure, only the mean bitrate of segments and the duration of each segment can be identified. The duration of each segment needs only to be defined in the first 'Representation' element because it is not changed depending on the 'Representation' element 211.

However, because video segments encoded at a variable bitrate have different sizes, it is necessary to add segment size information in the ' Segment' element 212 of each 'Representation' element 211 in order to eliminate the uncertainty of the segment size. As a result, the size of the existing MPD 210 is necessarily increased.

Figure 4:
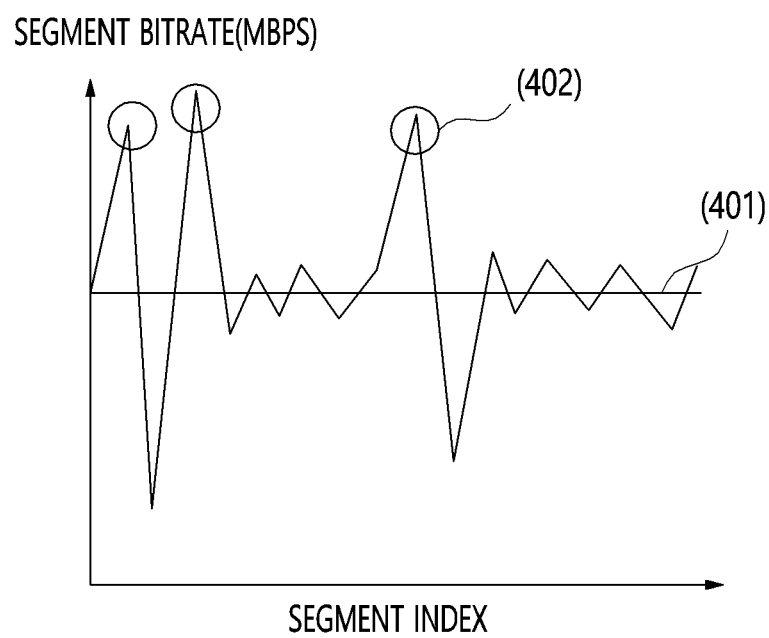
FIG. 4 is a graph illustrating the concept of a variable segment bitrate according to an embodiment.

FIG. 4 is a graph illustrating the concept of a variable segment bitrate according to an embodiment.

As illustrated in FIG. 4, the segment bitrate dynamically changes above and below the mean 401. If a client knows only the mean segment bitrate, when the segment bitrate is greater than the mean segment bitrate (402), predicted segment download time becomes longer, and a playback interruption problem may occur.

In the MPD structure in FIG. 3, the bitrate control module 110 based on the quality of viewing experience of a user knows only the mean bitrate of the segments. The segment download time may be calculated as shown in Equation (1):

$$\text{Segment Download Time} = \frac{\text{Segment bitrate} * \text{play time}}{\text{Throughput}} \quad (1)$$

The bitrate control module 110 selects the segment bitrate for maximizing the quality of viewing experience based on the segment download time calculated using Equation (1) and the segment bitrate. However, the throughput and segment bitrate used in Equation (1) dynamically change, which causes an error in the estimated segment download time. This error results in degradation of the quality of viewing experience.

In order to maximize the quality of viewing experience of a user, it is necessary to select a maximum segment bitrate while minimizing rebuffering time. When a value acquired by subtracting the time at which download of the requested segment is completed from the playback buffer level at the time at which the bitrate control module 110 requests the segment bitrate is defined as a margin, it is likely that the margin is small due to the policy of the bitrate control module 110 based on the quality of viewing experience, which maximizes the quality and minimizes rebuffering time. If the uncertainty in throughput and a segment bitrate is not solved when the margin is small, the quality of viewing experience of a user is degraded.

The present disclosure proposes a method for improving the quality of experience (QoE) by solving the uncertainty of a segment bitrate in an adaptive media streaming system.

Figure 5:
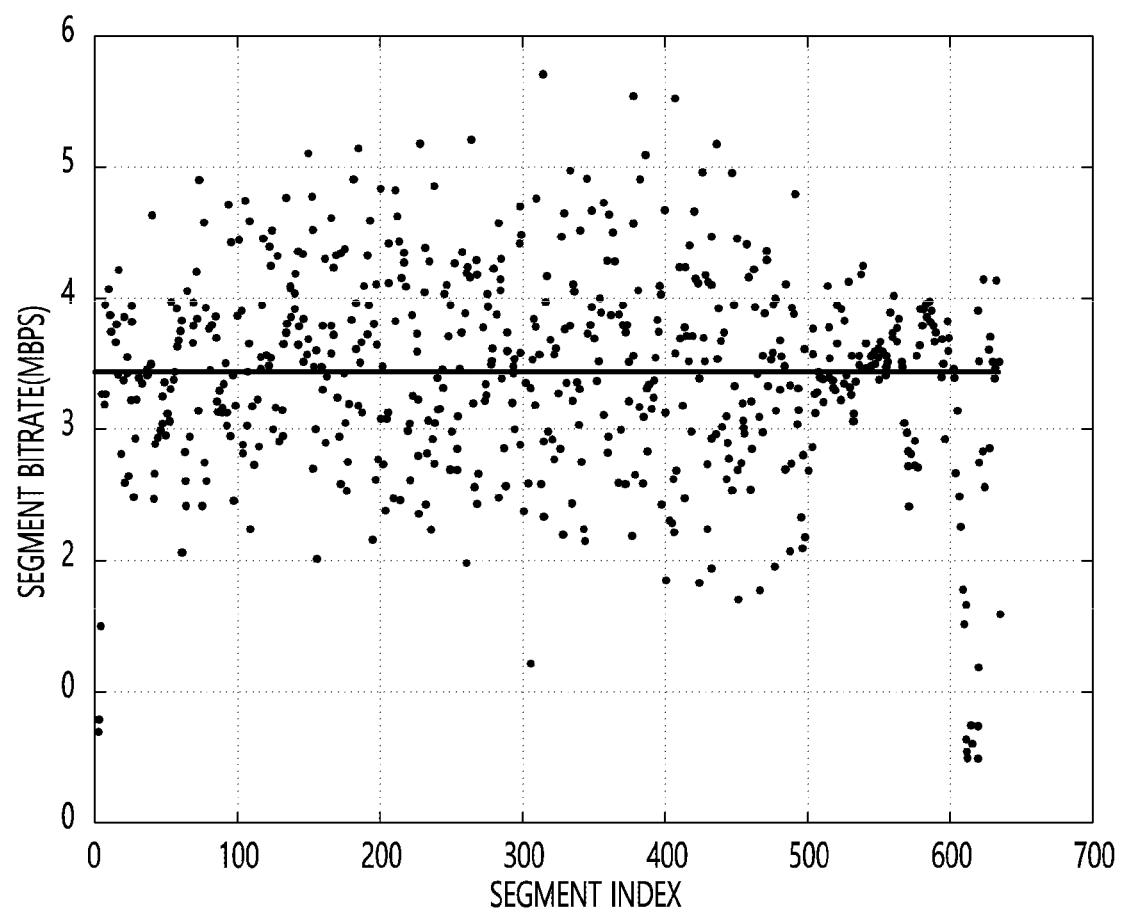
FIG. 5 is a graph illustrating a segment bitrate distribution according to an embodiment.

FIG. 5 is a graph illustrating the distribution of segment bitrates according to an embodiment.

FIG. 5 shows the distribution of the bitrates of segments of video content having a length of 10 minutes and 34 seconds and encoded at a variable bitrate with a mean bitrate of 3.4 Mbps. Here, the segments, excluding the last segment, have the same duration of one second. Referring to FIG. 5, it can be seen that the segment bitrate fluctuates over time.

Even if a client is able to accurately predict throughput, it is impossible to estimate the accurate segment download time when the segment bitrate randomly changes.

Figure 6:
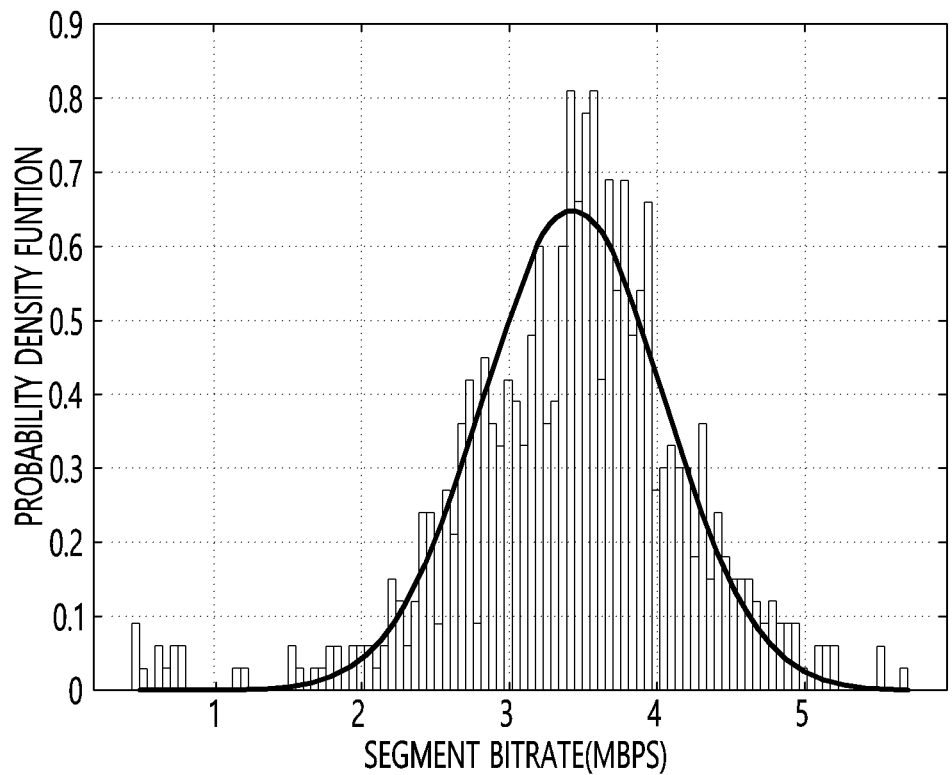
FIG. 6 is a graph illustrating a probability density function of the segment bitrate distribution of FIG. 5.

FIG. 6 is a graph illustrating a probability density function of the segment bitrate distribution of FIG. 5.

The mean of the segment bitrates of FIG. 5 is 3.4 Mbps, the variance thereof is 0.61 Mbps, and the solid line in FIG. 6 is a Gaussian probability distribution, the mean and variance of which are the above-mentioned mean and variance of the segment bitrates.

Here, it can be seen that the probability density function is similar to the Gaussian probability distribution, as illustrated in FIG. 6.

Figure 7:
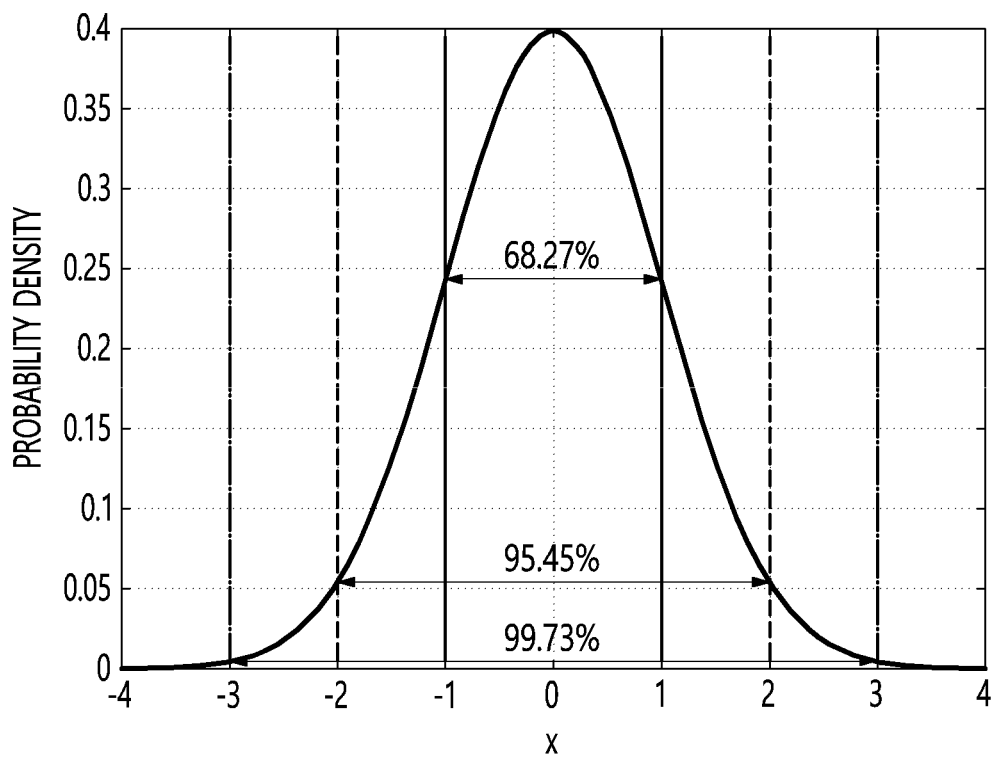
FIG. 7 is a graph illustrating a normal distribution according to an embodiment.

FIG. 7 is a graph illustrating a normal distribution according to an embodiment.

FIG. 7 shows a normal distribution, the mean and variance of which are 0 is 1, respectively, and values within one standard deviation (1σ) account for 68.27% in the normal distribution. Values within two standard deviations (2σ) and values within three standard deviations (3σ) account for 95.45% and 99.73%, respectively.

FIG. 8 is a view illustrating three standard deviations for the segment bitrate distribution of FIG. 5.

As illustrated in FIG. 8, when a segment bitrate is 4.21 Mbps, the value of the cumulative distribution function is 0.84135. That is, segments, the bitrate of which is less than 4.21 Mbps, account for 84.135% of the total segments. Assuming that network throughput is known, it means that segments, the download time of which is shorter than the download time of the segment that is estimated when the segment bitrate is 4.21 Mbps, are 84.135% of the total segments. In other words, the time is enough to download segments, excluding 15.865% of the total segments.

Model Predictive Control (MPC) is a representative adaptive bitrate algorithm based on the quality of experience of a user.

FIG. 9 is a view for explaining a segment bitrate selection method of MPC according to an embodiment.

FIG. 9 conceptually illustrates the selection of a segment bitrate of MPC. MPC may be performed by the bitrate control module, but is not limited thereto. As shown in FIG. 9, segment download time for each video quality level is calculated, and rebuffering time may be calculated using the calculated segment download time and the current buffer level. The quality of experience (QoE) of a user is calculated using the selected segment bitrate, the bitrate of a previously downloaded segment, and the calculated rebuffering time, and the segment bitrate for maximizing the QoE of the user may be finally selected.

The buffer level remaining after the download of the segment may be calculated as shown in Equation (2):

$$T_{n,k}^{RBL} = T_n^{BL} - T_{n,k}^{D} \quad (2)$$

Because MPC selects the segment bitrate for maximizing the QoE of a user, the buffer level cannot maintain a margin sufficient to compensate for the rebuffering time.

Therefore, in the present disclosure, the segment download time in FIG. 9 may be set as shown in Equation (3):

$$T_{n,k}^{D} = \frac{(R_{n,k} + v\sigma) \cdot T_n^{S}}{C_n} \quad (3)$$

Here, $C_n$ may denote network throughput, $R_k$ may denote the segment bitrate of the k-th video quality level in the n-th segment index, $v$ may denote a positive integer, $\sigma$ may denote the standard deviation of segment bitrates, and $T_n^{S}$ may denote segment duration.

FIG. 10 is a view illustrating the structure of a 'Representation' element in an MPD according to an embodiment.

As illustrated in FIG. 10, because Video-on-Demand (VOD) service stores video content that has been encoded at a variable bitrate, the standard deviation of segment bitrates of each video quality level is known. When the standard deviation value (std) is added in the 'Representation' element of the MPD, a client may use the value in order to select a segment bitrate.

Also, even though the 'Representation' element of the MPD is not modified, the client knows the mean bitrate by interpreting the MPD, so the client may calculate the standard deviation value using the bitrate information of the downloaded segments, as shown in Equation (4):

$$\sigma_{n,k} = \sqrt{\frac{1}{N} \sum_{n=1}^{N} (R_{n,k} - R_k)^2} \quad (4)$$

Here, N may denote the number of downloaded segments, $R_k$ may denote the mean segment bitrate of the k-th video quality level, and $R_{n,k}$ may denote the segment bitrate of the k-th video quality level in the n-th segment index.

The performance of the present disclosure is examined through a simulation.

FIG. 11 is a view illustrating the mean and standard deviation of the bitrates of segments encoded at a variable bitrate according to an embodiment.

As illustrated in FIG. 11, the video is "Big Buck Bunny" having the duration of ten minutes. Here, the duration of each segment is three seconds, and the size of a playback buffer is 25 seconds. The mean and standard deviation of the bitrates of the segments encoded at a variable bitrate are illustrated, and the unit therefor is Mbps.

Figure 13:
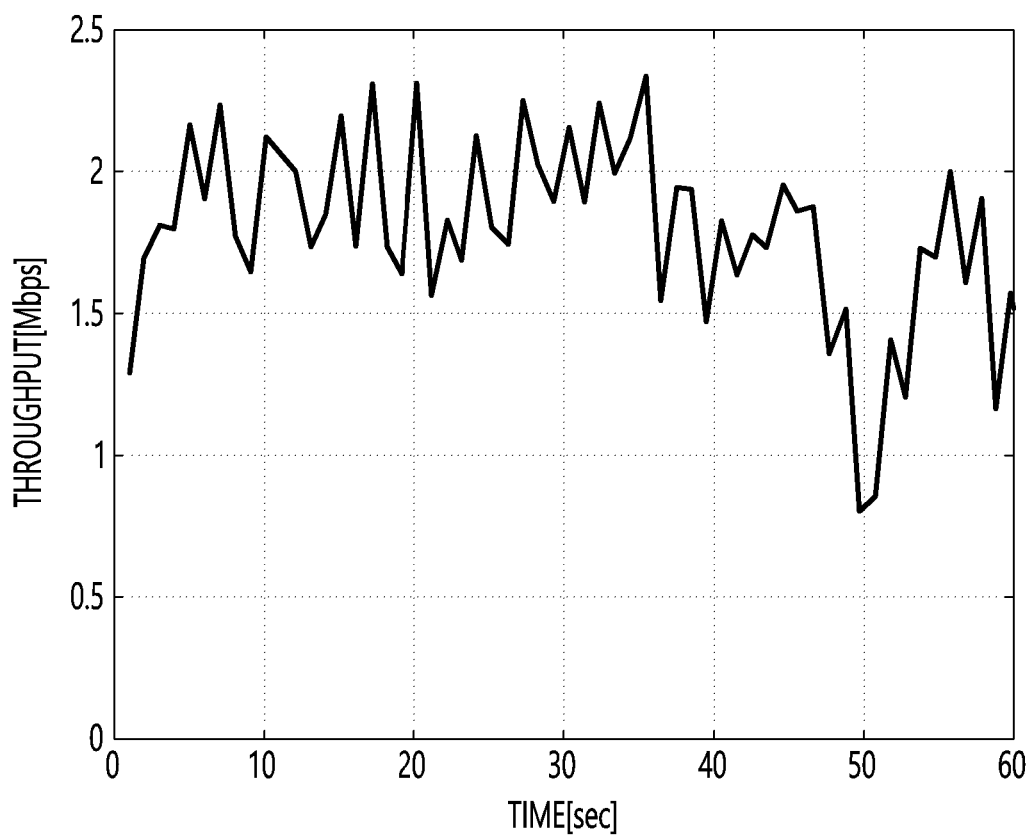
FIG. 13 is a graph illustrating variation in throughput of network trace 1 according to an embodiment.

FIG. 12 is a view illustrating the mean throughput of a network trace according to an embodiment, and FIG. 13 is a graph illustrating variation in the throughput of network trace 1 according to an embodiment.

As illustrated in FIG. 12, a network trace is configured with throughput duration, throughput, and latency, and five 3D/HSDPA network traces, which are collected during the travel by bus, subway, tram, and the like, are used. FIG. 12 illustrates the mean throughput of the network trace.

For the simulation, the quality of experience (QoE, or the quality of viewing experience) of a user may be defined as shown in Equation (5):

$$QoE = \frac{1}{N}\sum_{n=1}^{N} R_n - \frac{4.3}{N}\sum_{n=1}^{N} T_n - \frac{1}{N-1}\sum_{n=1}^{N-1} |R_{n+1} - R_n| \quad (5)$$

Figure 15:
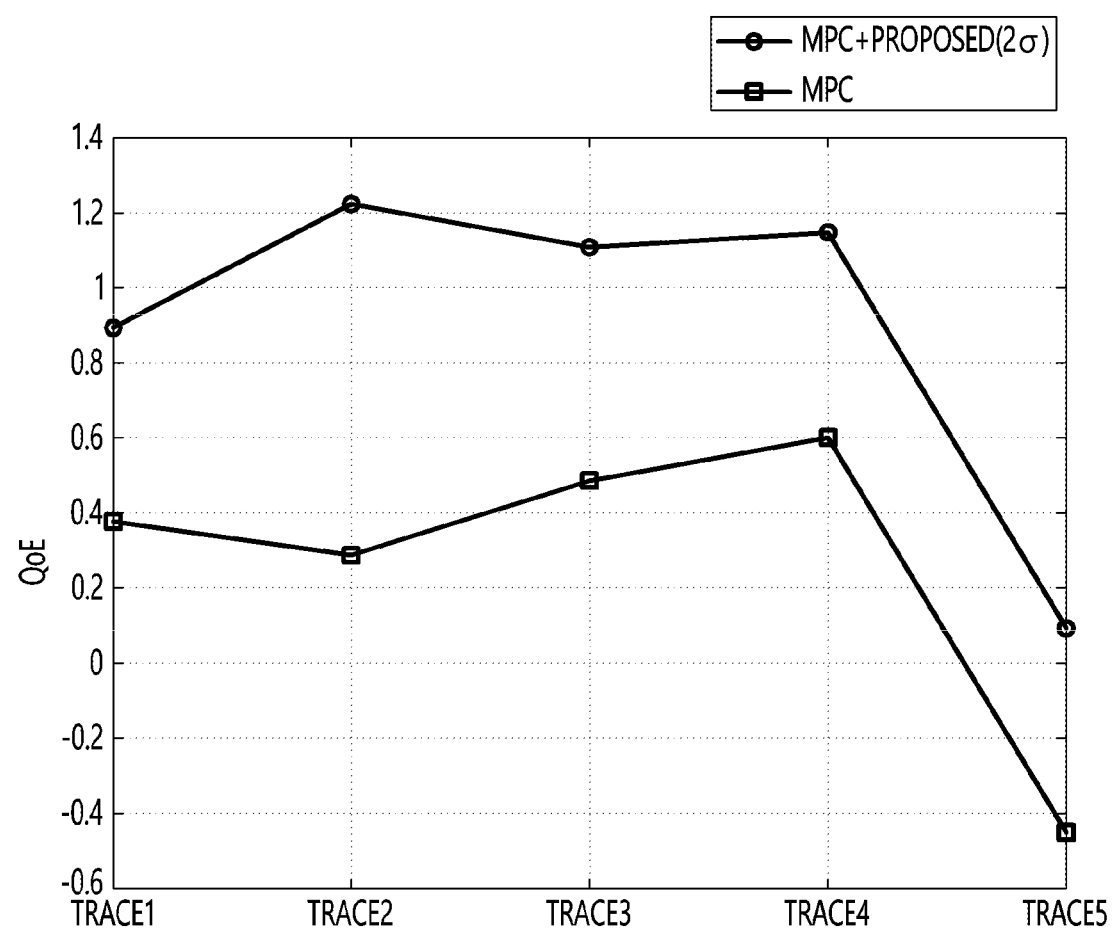
FIG. 15 is a graph illustrating a comparison in a result of performance evaluation of the QoE of a user between an embodiment and a conventional method.

FIG. 14 is a view illustrating a comparison in the result of performance evaluation of the quality of experience (QoE) of a user between an embodiment and a conventional method, and FIG. 15 is a graph illustrating a comparison in the result of performance evaluation of the QoE of a user between the embodiment and the conventional method.

As illustrated in FIG. 14 and FIG. 15, when the method proposed by the present disclosure is applied to the MPC algorithm, the quality of experience of a user is improved. When Equation (3) is calculated, the value of v is defined as 2, and the standard deviation value of FIG. 13 is used. It can be seen that, when the proposed method is used together with MPC, the quality of experience of a user is improved by at least more than two times the QoE obtained when only the MPC is used.

Figure 16:
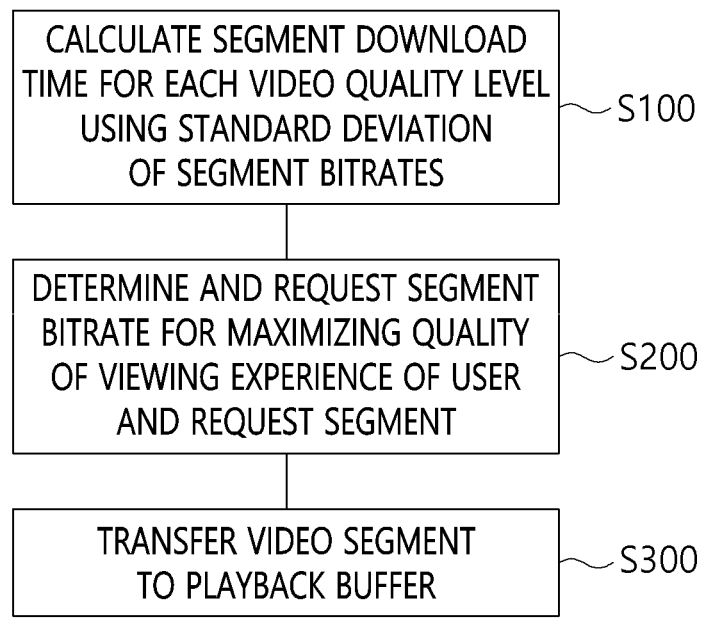
FIG. 16 is a flowchart illustrating an adaptive media streaming reception method performed by a client of an adaptive media streaming system according to an embodiment.

FIG. 16 is a flowchart illustrating an adaptive media streaming reception method performed by a client of an adaptive media streaming system according to an embodiment.

The client may calculate segment download time for each video quality level based on network throughput, a segment bitrate for the video quality level, segment duration, and a standard deviation of segment bitrates at step S100.

The client may determine a segment bitrate that maximizes the quality of viewing experience of a user based on the segment download time for each video quality level and a buffer level received from a playback buffer and request the same at step S200.

Figure 17:
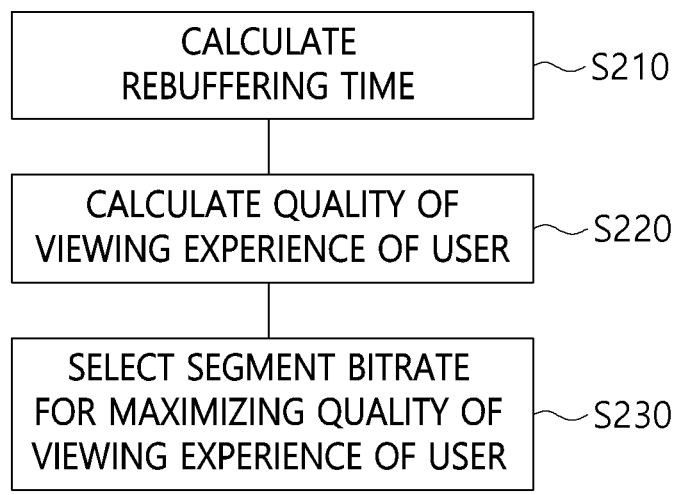
FIG. 17 is a flowchart illustrating a detailed process for determining a segment bitrate according to an embodiment.

FIG. 17 is a flowchart illustrating a detailed process for determining a segment bitrate according to an embodiment.

The client may calculate rebuffering time using the segment download time for each video quality level and the buffer level received from the playback buffer at step S210. The client may calculate the quality of viewing experience of a user using the segment bitrate, the bitrate of a previously downloaded segment, and the rebuffering time at step S220. The client may select the segment bitrate for maximizing the quality of viewing experience of the user at step S230.

Referring back to FIG. 16, the client transfers the request to the server, and may transfer the corresponding video segment received in response to the request to the playback buffer at step S300.

The apparatus for receiving adaptive media streaming according to an embodiment may be implemented in a computer system including a computer-readable recording medium.

Figure 18:
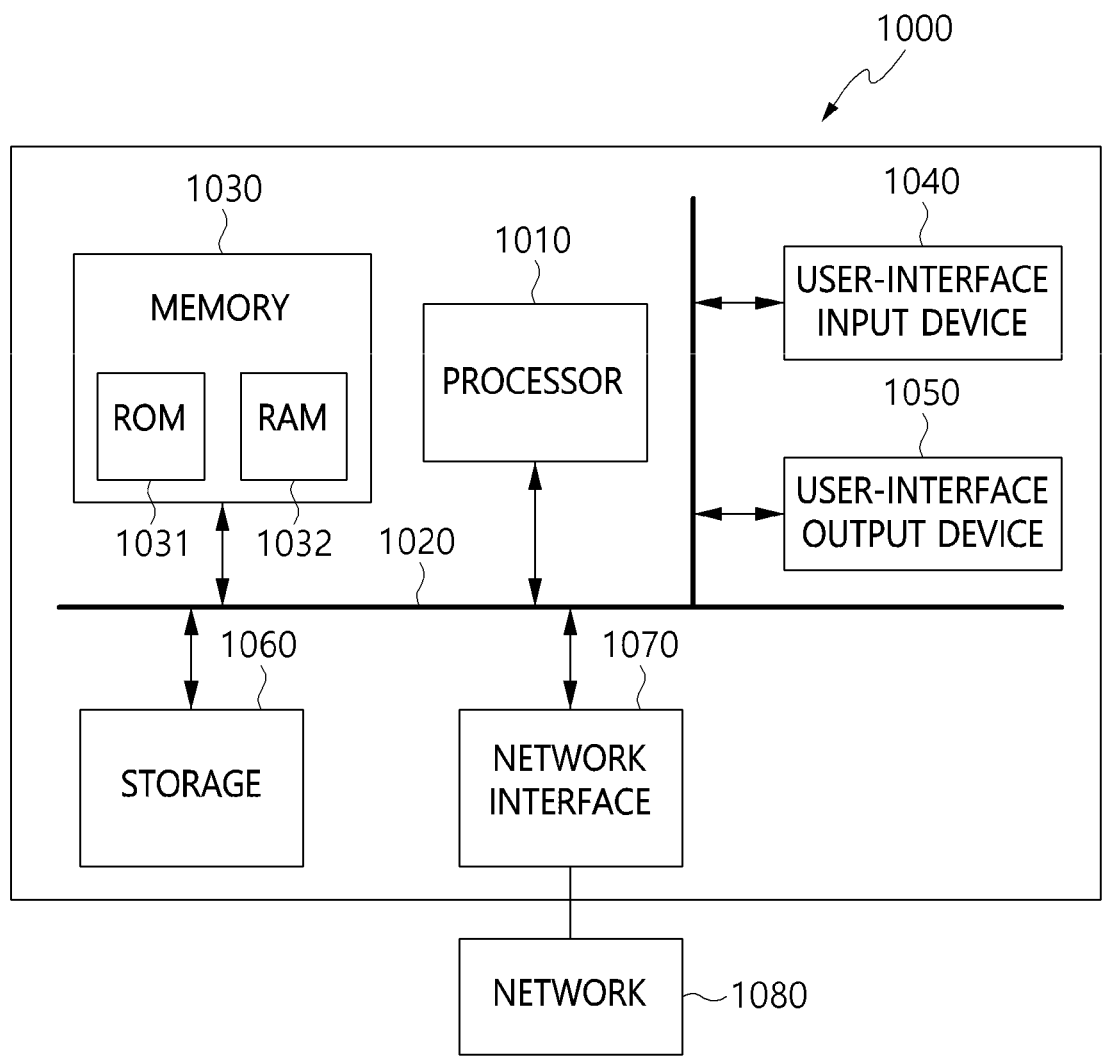
FIG. 18 is a block diagram illustrating the configuration of a computer system according to an embodiment.

FIG. 18 is a block diagram illustrating the configuration of a computer system according to an embodiment.

Referring to FIG. 18, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus for receiving adaptive media streaming.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for receiving adaptive media streaming according to an embodiment. Specifically, the memory may store multiple applications running in the apparatus for receiving adaptive media streaming and data and instructions for operation of the apparatus for receiving adaptive media streaming.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

Similarly, the apparatus for transmitting adaptive media streaming according to an embodiment may be implemented in a computer system including a computer-readable recording medium, and the configuration thereof may correspond to that illustrated in FIG. 18.

According to an embodiment, when a segment bitrate is estimated, the fact that the distribution of the bitrates of segments encoded at a variable bitrate follows a Gaussian distribution is used, whereby a suitable segment bitrate may be selected and the quality of experience of a user may be improved.

Also, an embodiment may improve the quality of experience of a user by setting a segment bitrate using the standard deviation of segment bitrates.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for receiving adaptive media streaming, comprising:
    calculating segment download time for each video quality level based on network throughput, a segment bitrate for the video quality level, segment duration, and a standard deviation of segment bitrates;
    determining a segment bitrate for maximizing quality of viewing experience of a user based on the segment download time for each video quality level and a buffer level received from a playback buffer and making a request for the segment bitrate; and
    transferring the request to a server and transferring a corresponding video segment received in response to the request to the playback buffer,
    wherein determining the segment bitrate for maximizing the quality of viewing experience of the user includes:
        calculating rebuffering time using the segment download time for each video quality level and the buffer level received from the playback buffer;
        calculating the quality of viewing experience of the user using the segment bitrate, a bitrate of a previously downloaded segment, and the rebuffering time; and
        selecting the segment bitrate for maximizing the quality of viewing experience of the user.

2. The method of claim 1, wherein the segment download time for each video quality level is calculated using Equation (1):

$$T_{n,k}^D = \frac{(R_{n,k} + v\sigma) \cdot T_n^S}{C_n} \quad (1)$$

where $C_n$ denotes the network throughput, $R_{n,k}$ denotes a k-th segment bitrate in an n-th segment index, v denotes a positive integer, $\sigma$ denotes the standard deviation of the segment bitrates, and $T_n^S$ denotes the segment duration.

3. The method of claim 2, wherein the standard deviation of the segment bitrates is acquired from a Media Presentation Description (MPD) of the server.

4. The method of claim 2, wherein the standard deviation of the segment bitrates is calculated based on a mean bitrate acquired by interpreting a Media Presentation Description (MPD) of the server.

5. The method of claim 4, wherein the standard deviation of the segment bitrates is calculated using Equation (2):

$$\sigma_{n,k} = \sqrt{\frac{1}{N}\sum_{n=1}^{N}(R_{n,k} - R_k)^2} \quad (2)$$

where N denotes a number of downloaded segments, $R_k$ denotes a mean segment bitrate for a k-th video quality level, and $R_{n,k}$ denotes a segment bitrate for a k-th video quality level in an n-th segment index.

6. An apparatus for receiving adaptive media streaming, comprising:
    memory in which a control program for receiving adaptive media streaming is stored; and
    a processor for executing the control program stored in the memory,
    wherein the processor calculates segment download time for each video quality level based on network throughput, a segment bitrate for the video quality level, segment duration, and a standard deviation of segment bitrates, determines a segment bitrate for maximizing quality of viewing experience of a user based on the segment download time for each video quality level and a buffer level received from a playback buffer, makes a request for the determined segment bitrate, transfers the request to a server, and transfers a corresponding video segment received in response to the request to the playback buffer, and
    wherein the processor calculates rebuffering time using the segment download time for each video quality level and the buffer level received from the playback buffer, calculates the quality of viewing experience of the user using the segment bitrate, a bitrate of a previously downloaded segment, and the rebuffering time, and selects the segment bitrate for maximizing the quality of viewing experience of the user.

7. The apparatus of claim 6, wherein the segment download time for each video quality level is calculated using Equation (1):

$$T_{n,k}^D = \frac{(R_{n,k} + v\sigma) \cdot T_n^S}{C_n} \quad (1)$$

where $C_n$ denotes the network throughput, $R_{n,k}$ denotes a segment bitrate of the k-th video quality level in the n-th segment index, v denotes a positive integer, $\sigma$ denotes the standard deviation of the segment bitrates, and $T_n^S$ denotes the segment duration.

8. The apparatus of claim 7, wherein the standard deviation of the segment bitrates is acquired from a Media Presentation Description (MPD) of the server.

9. The apparatus of claim 7, wherein the standard deviation of the segment bitrates is calculated based on a mean bitrate acquired by interpreting a Media Presentation Description (MPD) of the server.

10. The apparatus of claim 9, wherein the standard deviation of the segment bitrates is calculated using Equation (2):

$$\sigma_{n,k} = \sqrt{\frac{1}{N}\sum_{n=1}^{N}(R_{n,k} - R_k)^2} \quad (2)$$

where N denotes a number of downloaded segments, $R_k$ denotes a mean segment bitrate for a k-th video quality level, and $R_{n,k}$ denotes the segment bitrate for a k-th video quality level in an n-th segment index.

11. An adaptive media streaming system, comprising:
    a client including a network throughput predictor module for predicting network throughput, a bitrate control module for calculating segment download time for each video quality level based on the network throughput, a segment bitrate for the video quality level, segment duration, and a standard deviation of segment bitrates, determining a segment bitrate for maximizing quality of viewing experience of a user based on the segment download time for each video quality level and a buffer level received from a playback buffer, and making a request for the determined segment bitrate, and an HTTP module for transferring the request to a server; and the server for transferring a corresponding video segment to the HTTP module in response to the request, wherein the client calculates rebuffering time using the segment download time for each video quality level and the buffer level received from the playback buffer, calculates the quality of viewing experience of the user using the segment bitrate, a bitrate of a previously downloaded segment, and the rebuffering time, and selects the segment bitrate for maximizing the quality of viewing experience of the user.

12. The adaptive media streaming system of claim 11, wherein the server stores video segments encoded in advance at different bitrates and a Media Presentation Description (MPD) in which segment-related information is described.

13. The adaptive media streaming system of claim 12, wherein the MPD includes the standard deviation of the segment bitrates.

14. The adaptive media streaming system of claim 11, wherein the segment download time for each video quality level is calculated using Equation (1):

$$T_{n,k}^D = \frac{(R_{n,k} + v\sigma) \cdot T_n^S}{C_n} \quad (1)$$

where $C_n$ denotes the network throughput, $R_{n,k}$ denotes a segment bitrate of the k-th video quality level in the n-th segment index, v denotes a positive integer, $\sigma$ denotes the standard deviation of the segment bitrates, and $T_n^S$ denotes the segment duration.

15. The adaptive media streaming system of claim 14, wherein the standard deviation of the segment bitrates is calculated based on a mean bitrate acquired by interpreting a Media Presentation Description (MPD) of the server.

16. The adaptive media streaming system of claim 15, wherein the standard deviation of the segment bitrates is calculated using Equation (2):

$$\sigma_{n,k} = \sqrt{\frac{1}{N}\sum_{n=1}^{N}(R_{n,k} - R_k)^2} \quad (2)$$

where N denotes a number of downloaded segments, $R_k$ denotes a mean segment bitrate for a k-th video quality level, and $R_{n,k}$ denotes the segment bitrate for a k-th video quality level in an n-th segment index.

\* \* \* \* \*